Patented June 23, 1942

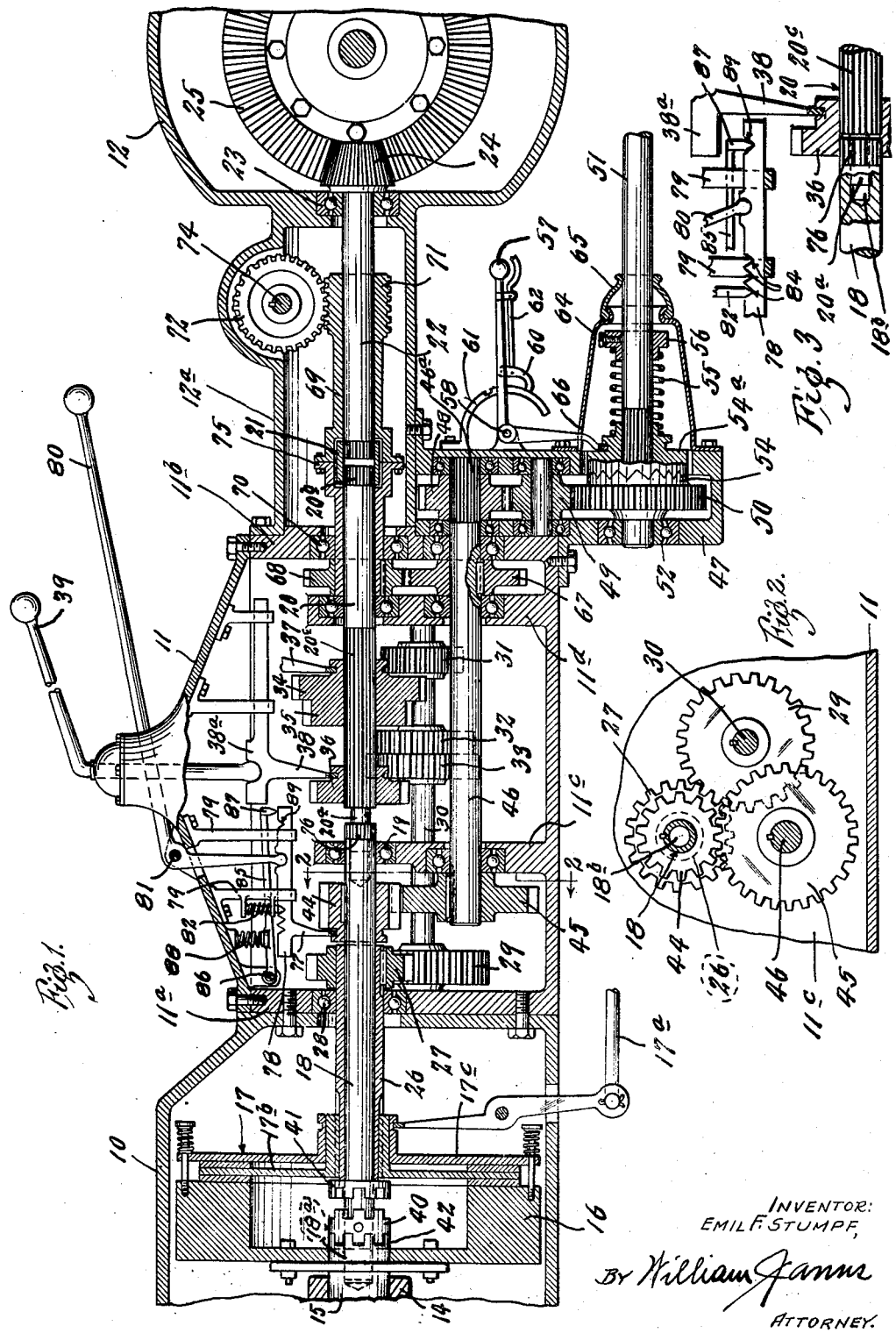

2,287,279

UNITED STATES PATENT OFFICE 2,287,279

CONTINUOUS POWER TAKEOFF DRIVE

Emil F. Stumpf, Valmeyer, Ill.

Application January 16, 1941, Serial No. 374,734

20 Claims. (Cl. 74—11)

This invention relates to a continuous power takeoff drive for tractors whereby machinery operated by the tractor can be continuously operated irrespective of whether the latter is stationary or moving.

In the operation of a tractor it becomes necessary at times to stop the tractor or to drive slowly. When a combine or other farm machinery is driven by a power takeoff shaft which stops or slows down with the tractor, the combine cannot be operated in an efficient manner, especially when full of unthreshed wheat or other grain.

In my copending application, Serial No. 341,427, filed June 20, 1940, a continuous power takeoff drive is disclosed which is particularly adapted for use with tractors of the "Oliver" type wherein the drive shaft of the differential mechanism is offset with respect to the engine shaft.

Among the main objects of the present invention is the provision of a continuous power takeoff drive adapted to be used in tractors of the "Allis Chalmers" type in which the drive shaft for the differential mechanism is in a straight line or axial alignment with the engine shaft.

Another object of the invention is to place the transmission counter shaft to one side of the vertical plane of the aligned shafts to enable the location of the power takeoff shaft in a vertical plane with said engine and differential shafts.

Another object of the invention is to provide an intermediate or counter shaft for a power takeoff mechanism, which shaft is adapted to drive both the power lift shaft and the power takeoff shaft.

Another object of the invention is to provide a power takeoff mechanism which can be operated without shifting into neutral when the tractor is stopped by the usual friction clutch.

Other objects of the invention are so to mount the power takeoff shaft that it can be removed without the necessity of dismantling or draining the transmission casing.

Another object of the invention is to provide a disengageable escapement or dental slip clutch which can be disengaged when making short turns with a tractor pulling power-driven machinery in order to avoid excessive strain on the universal joint.

A further object of the invention is to provide a straight or direct high gear drive between the engine shaft and the differential mechanism and a safety latch whereby the longitudinal shiftable shaft has to be out of disengagement with the engine shaft before it can be coupled for direct drive.

With these and other objects in view, my invention consists in certain novel features of construction and arrangement of parts, hereinafter more fully described and claimed, and illustrated in the accompanying drawing, in which—

Figure 1 is a side elevation of my power takeoff drive mechanism and parts associated therewith.

Figure 2 is an enlarged cross section taken on line 2—2 of Figure 1.

Figure 3 is an enlarged detail view showing the safety latch in moved position.

Referring by numerals to the accompanying drawing, 10 indicates part of the tractor frame, 11 the transmission casing having end walls 11a and 11b and partition walls 11c and 11d, and 12 the differential housing. Mounted in a housing 14 is one end of the engine shaft 15. A fly wheel 16 is fixed on said shaft and cooperating with said fly wheel is a clutch means 17 of usual construction and operable in the usual manner by a suitable connection 17a.

A shaft 18 is disposed coaxially with engine shaft 15 and has one end 18a slidably mounted in a bore formed in the corresponding end of said shaft 15. Shaft 18 extends into transmission casing 11 through end wall 11a thereof and has its other end slidably journaled in a ball bearing 19 mounted in a partition will 11c of casing 11. A shaft 20 has one end 20a reduced in diameter and journaled in a bore 18b formed in the corresponding end of shaft 18. This shaft 20 is journaled in a bearing in partition wall 11d and extends into the tubular extension 12a of differential housing 12. The end 20b of said shaft 20 is secured by a coupling 21 to the corresponding end of a coaxially disposed shaft 22. The latter extends through said housing 12a into the differential housing 12, being journaled in bearing 23 and carries a beveled pinion 24 which meshes with a beveled gear 25 of the differential mechanism.

A tubular shaft 26 is concentrically disposed with shaft 18 and is preferably rotatively mounted thereon and has one end extending into the transmission casing 11 to receive a pinion 27. A ball bearing 28 is provided for said tubular shaft in the end wall 11a. Pinion 27 meshes with a gear 29 which is fixed on a counter shaft 30 journaled in end wall 11b and partition wall 11c and disposed to one side of the vertical plane of the axis of shafts 18 and 20. A gear 31 is fixed on shaft 30 near wall 11d and gears 32 and 33 are fixed on said shaft in spaced relation with gear 31.

Slidably mounted on shaft 20, but in non-rotative engagement therewith, are transmission gears 34, 35 and 36. Gears 34, and 35 are adapted to be shifted in one direction to bring gear 34 into engagement with gear 31 to provide first speed, or in opposite direction to bring gear 35 into engagement with gear 32 to provide second speed. Gear 36 is adapted to be moved in one direction into engagement with gear 33 to provide third speed. Gears 34 and 35 are operated by a shifting fork 37 and gear 36 is operated by a shifting fork 38. Either fork can be shifted in the usual manner by a gear shift lever 39. Thus a tractor driving connection is established from the engine shaft 15 through clutch means 17, tubular shaft 26, gears 27 and 29, counter shaft 30, and gears 31, 32 or 33, with the shiftable gears 34, 35 or 36, shafts 20 and 22, and pinion 24 and gear 25.

To disconnect the drive, clutch means 17 is actuated by the operating connection 17a in the usual manner.

Power takeoff drive

As stated before, shaft 18 is slidably mounted in tubular shaft 26. Mounted on said shaft 18 between the end of shaft 15 and the corresponding end of tubular shaft 26 is a double faced clutch element 40 which is adapted to enter into engagement either with a clutch element 41, fixed to the tubular shaft 26, or with a clutch element 42 formed on the end of engine shaft 15, as shown in Figure 1.

Fixed to shaft 18 in spaced relation with gear 27 and partition wall 11c is a pinion 44 which meshes with a gear 45 fixed on a counter shaft 46. This shaft is disposed below and in a vertical plane with the axis of shaft 18, as shown in Figure 2, and is journaled in bearings disposed in partition walls 11c and 11d and end wall 11b. This shaft extends through said end wall 11b into a casing 47 fixed to transmission casing 11 and to tubular extension 12a and has bearing in said casing 47. A gear 48 is fixed on shaft 46 in casing 47 and meshes with an idler gear 49 journaled in said casing below said first gear. This idler meshes with a gear 50 which is loosely mounted on a horizontally disposed shaft 51. This is the power takeoff shaft and is used to provide power for operating various machinery independently of the transmission drive. One end of this power takeoff shaft 51 is journaled in a bearing 52 in casing 47 and the shaft extends outwardly and rearwardly from said casing. An overload release coupling is used to connect and disconnect said shaft 51 from said gear 50. This coupling consists of one element 54 fixed to said gear and a complementary element 54a slidably and non-rotatably mounted on shaft 51. The opposed faces of said elements are adapted to be interengaged to provide the driving connection. A coiled spring 55 bears at one end against a collar 56 fixed on said shaft 51 and at the opposite end against the slidable element 54a, thereby forcing it yieldably against the element 54. Thus when the double clutch element 40 is in engagement with clutch element 42, the power is transmitted from the engine shaft 15 to shaft 18, gears 44 and 45 to shaft 46, thence through gears 48, 49 and 50 and overload release coupling 54 to power takeoff shaft 51. As the shaft 18 is in direct engagement with engine shaft 15, shaft 51 is actuated regardless of whether the clutch means 17 is in engagement or out of engagement with said engine shaft.

Shaft 51 can be disconnected from gear 50 by means of a hand operated lever 57 which is pivoted at 58 on casing 47 and operates a shifting fork 59 which engages a collar on said slidable clutch member 54a and moves the latter against the tension of the spring 55. The lever 57 can be locked in disengaging position by a pawl 60 which is adapted to engage a notch in a stationary segment 61. A rod 62 is operated in the usual manner to release said pawl and permit the clutch member 54a to move into engagement with clutch member 54. A housing 64 is attached at one end to casing 47 and encloses said spring 55 and collar 56 and is provided with a dust shield 65. An elongated slot 66 is formed in housing 64 for the admission of the forked end of lever 57.

The power lift

A gear 67 is fixed to shaft 46 between partition walls 11d and end wall 11b and meshing with this gear is a gear 68 fixed to one section of a tubular shaft 69. This tubular shaft operates on shaft 22 and is journaled in a bearing 70 in walls 11d and 11b. One end of said tubular shaft terminates in the extension 12a and has formed thereon a worm 71 which engages a worm gear 72 fixed on a power lift shaft 74.

Preferably, tubular shaft 69 is formed in two sections secured together at a point coinciding with coupling 21, as indicated at 75. Thus the power lift mechanism can be operated simultaneously with both the transmission drive and the power takeoff drive or in conjunction with either one or alone.

Direct drive

When shaft 18 is operated or shifted longitudinally to bring the clutch element 40 into engagement with clutch element 41, the inner or rear end of said shaft is brought against the corresponding end of shaft 20. This end of shaft 18 is provided with a plurality of splines 76 which are identical in size and spacing with similar splines formed on the transmission shaft 20. Gear 36 is adapted to be shifted forward by lever 39 to engage said splines 76 while retaining non-rotative engagement with shaft 20, thereby coupling said shafts together and establishing a direct drive between the clutch member 17 and the differential pinion 24.

Shaft 18 is shifted by fork 77 which engages a collar on gear 44 fixed to said shaft. This fork 77 is carried by a horizontally disposed bar 78 which is slidably mounted in stationary brackets 79 and has an operating engagement with a manually operated lever 80 pivotally mounted on casing 11 at 81. A vertically disposed spring-pressed pin 82 is slidably mounted in one of said brackets and is adapted to engage one of three notches 84 formed in the upper edge of bar 78 so as to yieldably hold said bar in one of three positions corresponding to the three positions of shaft 18, namely, engine shaft 15 engaging position, neutral or central position, and clutch means 17 engaging position.

In order to prevent shifting of gear or coupling member 36 into engagement with shaft 18, while the latter is in driving engagement with shaft 15 or in neutral position, safety means are provided which permit the shifting of said gear coupling 36 only when said shaft 18 and clutch element 40 are in engagement with the clutch element 41 of clutch means 17. This safety means comprises a lever 85 pivoted at one end to the casing 11 at 86 and having its opposite end provided with a downwardly presented finger 87 which normally rides on the upper edge of bar 78 and holds said end of lever 85 raised and in the path of forward movement of horizontal bar 38a of fork 38. Thus said bar 38a cannot be moved forwardly and the gear or coupling 36 cannot be shifted into engagement with the shaft 18.

A coiled spring 88 is interposed between lever 85 and casing 11 and yieldably forces finger 87 against bar 78. When the shaft 18 is shifted against shaft 20, the finger 87 drops into a notch 89 so that said finger and the end of lever 85 are disposed below the horizontal plane of the slidable bar 38a and the latter can now be moved forward.

In starting the power takeoff shaft, the clutch element 40 is first moved into neutral. The engine is then started and friction clutch 17 disengaged. Clutch element 40 is then shifted into engagement with clutch element 41. Then clutch 17 is engaged, thus actuating the power takeoff mechanism and the transmission counter shaft 30. When the shiftable shaft 18 runs at its normal speed (at same speed as the engine shaft 15) clutch member 40 is shifted into engagement with clutch element 42. The power takeoff shaft is now driven from the engine shaft 15 and is independent of clutch 17. Thus the power takeoff shaft 51 is not affected by the disengagement of clutch 17 and is continuously driven at the required speed, regardless of whether the tractor is at standstill or operated at low speed.

The clutch member 17b is splined on the end of the tubular shaft 26 and is movable relatively to the fly wheel 16. The clutch member 17c is slidably mounted on the hub of clutch member 17b and is movable to make and break the driving engagement between said fly wheel 16 and the tubular shaft 26, and also shaft 18 when the latter is interlocked with clutch member 17b through said tubular shaft 26.

The clutch element 41 rotates with said shaft 26 and clutch member 17b and when engaged by clutch element 40 transmits the power from shaft 15 through fly wheel 16 and clutch 17 and tubular shaft 26 to said clutch elements 40 and 41 and thence to shaft 18.

The shiftable transmission gears 34, 35 and 36 are mounted in the spline end 20c of shaft 20 and are adapted to engage the respective gears fixed on the transmission counter shaft 30. In addition, gear 36 acts as a coupling or spline hub for interengaging shafts 18 and 20 to provide a straight drive between the engine shaft 15 and differential bevel gear 24.

The transmission counter shaft 30 is disposed to one side of the vertical plane of shafts 18 and 20, thereby permitting the power takeoff counter shaft 46 and the power takeoff shaft 51 to be placed in said vertical plane.

The power takeoff counter shaft 46 is mounted in casing 11 and has one end 46a projecting outward therefrom into casing 47. The latter is removable from casing 11 together with the gearing contained therein. The end 46a of shaft 46 is formed with splines to permit removal and replacement of gear 48. Thus the power takeoff shaft 51 and casing 47 can be removed without the necessity of opening and draining casing 11 or disturbing the gearing contained therein. A cap (not shown) can be placed over the projecting end 46a when casing 47 is removed.

The differential casing 12 can also be detached from casing 11 without opening the latter.

My improved power takeoff drive is adapted to be used in tractors having the power delivery or bevel pinion 24 in axial alignment with the engine shaft 15 and permits the power takeoff shaft to be located below and in a vertical plane with said aligned axes. The power takeoff shaft 51 can be continuously operated during stopping and starting of the tractor, or it can be stopped simultaneously with the tractor. The driving connection between the tubular shaft 26 and the transmission countershaft 30 permits the transmission drive to straddle the driving connection between the shaft 18 and transmission shaft 20 so that a direct driving connection can be had between said shafts 18 and 20. This straddle drive also permits the driving connection between the shaft 18 and the countershaft 46 of the power takeoff drive.

My improved drive mechanism is simple in operation and highly efficient in performing its intended functions and can be readily applied to that type of tractor having coaxially aligned engine and differential bevel gear shafts.

While I have disclosed herein the preferred embodiment of my drive mechanism, it is obvious that various changes in the construction and arrangement of parts thereof can be made without departing from the nature and spirit of my invention.

I claim:

1. In a tractor having an engine shaft and a transmission shaft disposed coaxially with each other; a longitudinally movable shaft disposed coaxially between said shafts, means for effecting driving engagement between said movable shaft and said transmission shaft, a tubular shaft revolubly mounted on said movable shaft, a clutch means for connecting and disconnecting said tubular shaft from said engine shaft, transmission mechanism actuated by said tubular shaft for driving said transmission shaft, a power takeoff shaft arranged below said transmission shaft, and power takeoff mechanism operated by said movable shaft and actuating said power takeoff shaft.

2. In a tractor having an engine shaft and a transmission shaft disposed coaxially with each other; a longitudinally movable shaft disposed coaxially between said shafts, means for effecting driving engagement between said movable shaft and said transmission shaft, a tubular shaft revolubly mounted on said movable shaft, a clutch means for connecting and disconnecting said tubular shaft from said engine shaft, transmission mechanism actuated by said tubular shaft for driving said transmission shaft, a power takeoff shaft arranged below said transmission shaft, power takeoff mechanism operated by said movable shaft and actuating said power takeoff shaft, and a clutch for disconnecting said power takeoff shaft from said power takeoff mechanism.

3. In a tractor having an engine shaft and a transmission shaft disposed coaxially with each other; an intermediate shaft disposed coaxially between said shafts, means for effecting driving engagement between said intermediate shaft and said engine shaft, a tubular shaft concentrically mounted with said intermediate shaft, a clutch means for connecting and disconnecting said tubular shaft from said engine shaft, transmission mechanism actuated by said tubular shaft for driving said transmission shaft, a power takeoff shaft arranged below said transmission shaft, power takeoff mechanism operated by said intermediate shaft and actuating said power takeoff shaft, and an overload release coupling interposed between said power takeoff shaft and its actuating mechanism.

4. In a tractor having an engine shaft and a transmission shaft disposed coaxially with each other; an intermediate shaft disposed coaxially between said shafts, means for effecting driving engagement between said intermediate shaft and said engine shaft, a tubular shaft concentrically mounted with said intermediate shaft, a clutch means for connecting and disconnecting said tubular shaft from said engine shaft, transmission mechanism actuated by said tubular shaft for driving said transmission shaft, a power takeoff shaft arranged below said transmission shaft, power takeoff mechanism operated by said intermediate shaft and actuating said power takeoff shaft, an overload release coupling interposed between said power takeoff shaft and its actuating mechanism, and a manually operable means for operating said escapement clutch to disengage said power takeoff shaft from its actuating mechanism.

5. In a tractor having an engine shaft and a transmission shaft disposed coaxially with each other; a longitudinally movable shaft disposed coaxially between said shafts, means for effecting driving engagement between said movable shaft and said transmission shaft, a tubular shaft revolubly mounted on said movable shaft, a clutch means for connecting and disconnecting said tubular shaft from said engine shaft, transmission mechanism actuated by said tubular shaft for driving said transmission shaft, a power takeoff shaft arranged below said transmission shaft, power takeoff mechanism operated by said movable shaft and actuating said power takeoff shaft, a clutch for disconnecting said power takeoff shaft from said power takeoff mechanism, a power lift shaft, and means operated by said power takeoff mechanism for actuating said power lift shaft.

6. In a tractor, an engine shaft, a transmission shaft disposed coaxially therewith, a longitudinally shiftable shaft disposed between and coaxially with said shafts, a tubular shaft mounted concentrically with shiftable shaft and terminating short of the ends thereof, a friction clutch interposed between said engine shaft and said tubular shaft, a clutch element fixed on one end of said engine shaft, an opposed clutch element fixed on the opposed end of said tubular shaft, a double-faced clutch element fixed on said shiftable shaft and movable into engagement with either of said clutch elements, transmission mechanism operated by said tubular shaft and actuating said transmission shaft, a power takeoff shaft disposed below said transmission shaft, a power takeoff mechanism operable by said shiftable shaft and actuating said power takeoff shaft, and means operable to effect operating engagement between said shiftable shaft and said transmission shaft, whereby the latter can be driven in a straight line direct from said engine shaft.

7. In a tractor, an engine shaft, a transmission shaft disposed coaxially therewith, a longitudinally shiftable shaft disposed between and coaxially with said shafts, a tubular shaft mounted concentrically with shiftable shaft and terminating short of the ends thereof, a friction clutch interposed between said engine shaft and said tubular shaft, a clutch element fixed on one end of said engine shaft, an opposed clutch element fixed on the opposed end of said tubular shaft, a double-faced clutch element fixed on said shiftable shaft and movable into engagement with either of said clutch elements, transmission mechanism operated by said tubular shaft and actuating said transmission shaft, a power takeoff shaft disposed below said transmission shaft, a power takeoff mechanism operable by said shiftable shaft and actuating said power takeoff shaft, means operable to effect operating engagement between said shiftable shaft and said transmission shaft, whereby the latter can be driven in a straight line direct from said engine shaft, a power lift shaft, and driving mechanism operable by said power takeoff mechanism for actuating said power lift shaft.

8. In a tractor, an engine shaft, a transmission shaft disposed coaxially therewith, a longitudinally shiftable shaft disposed between and coaxially with said shafts, a tubular shaft mounted concentrically with shiftable shaft and terminating short of the ends thereof, a friction clutch interposed between said engine shaft and said tubular shaft, a clutch element fixed on one end of said engine shaft, an opposed clutch element fixed on the opposed end of said tubular shaft, a double-faced clutch element fixed on said shiftable shaft and movable into engagement with either of said clutch elements, transmission mechanism operated by said tubular shaft and actuating said transmission shaft, a power takeoff shaft disposed below said transmission shaft, a power takeoff mechanism operable by said shiftable shaft and actuating said power takeoff shaft, means operable to affect operating engagement between said shiftable shaft and said transmission shaft, whereby the latter can be driven in a straight line direct from said engine shaft, a tubular shaft revolubly mounted on said transmission shaft, operating connections between said power takeoff mechanism and tubular shaft, and a power lift shaft driven by said tubular shaft.

9. In a tractor having coaxially aligned an engine shaft and a transmission shaft; a longitudinally shiftable shaft disposed between and coaxially with said shafts, a tubular shaft revolubly mounted on said shiftable shaft and terminating short of the ends thereof, a friction clutch fixed on one end of said tubular shaft for cooperation with said engine shaft, a transmission gearing operable by the other end of said tubular shaft and actuating said transmission shaft, a power takeoff shaft disposed below said transmission shaft, power takeoff mechanism operable by said shiftable shaft for actuating said power takeoff shaft, and means on said shiftable shaft for operatively connecting the latter either with said tubular shaft for simultaneous operation of said power takeoff shaft and said transmission shaft, or with said engine shaft for continuous operation of said power takeoff shaft independently of said transmission shaft.

10. In a tractor having coaxially aligned an engine shaft and a transmission shaft; a longitudinally shiftable shaft disposed between and coaxially with said shafts, a tubular shaft revolubly mounted on said shiftable shaft and terminating short of the ends thereof, a friction clutch fixed on one end of said tubular shaft for cooperation with said engine shaft, a transmission gearing operable by the other end of said tubular shaft and actuating said transmission shaft, a power takeoff shaft disposed below said transmission shaft, power takeoff mechanism operable by said shiftable shaft for actuating said power takeoff shaft, means on said shiftable shaft for operatively connecting the latter either with said tubular shaft for simultaneous operation of said power shaft and said transmission shaft or with said engine shaft for continuous operation of said power shaft independently of said transmission shaft, and a coupling for operatively interengaging said shiftable shaft and said transmission shaft to provide direct drive from said engine shaft.

11. In a tractor having coaxially aligned an engine shaft and a transmission shaft, a longitudinally shiftable shaft disposed between and coaxially with said shafts, a tubular shaft revolubly mounted on said shiftable shaft and terminating short of the ends thereof, a friction clutch fixed on one end of said tubular shaft for cooperation with said engine shaft, a transmission gearing operable by the other end of said tubular shaft and actuating said transmission shaft, a power takeoff shaft disposed below said transmission shaft, power takeoff mechanism operable by said shiftable shaft for actuating said power takeoff shaft, means on said shiftable shaft for operatively connecting the latter either with said tubular shaft for simultaneous operation of said power takeoff shaft and said transmission shaft or with said engine shaft for continuous operation of said power takeoff shaft independently of said transmission shaft, a coupling for operatively interengaging said shiftable shaft and said transmission shaft to provide direct drive from said engine shaft, and means for permitting movement of said coupling into operative position only when said shiftable shaft is disengaged from said engine shaft.

12. In a tractor, an engine shaft, a transmission shaft disposed coaxially therewith, a longitudinally shiftable shaft disposed between and coaxially with said shafts, a tubular shaft journaled concentrically with said shiftable shaft, transmission gearing connecting said tubular shaft with said transmission shaft, a friction clutch for operating said tubular shaft by said engine shaft, a power takeoff shaft, gearing connecting said shiftable shaft with said power takeoff shaft, and a clutch for connecting said shiftable shaft with said tubular shaft or said engine shaft, whereby said power takeoff can be operated either simultaneously with said transmission gearing or independently thereof by said engine shaft.

13. In a tractor, an engine shaft, a transmission shaft disposed coaxially therewith, a longitudinally shiftable shaft disposed between and coaxially with said shafts, a tubular shaft journaled concentrically with said shiftable shaft, transmission gearing connecting said tubular shaft with said transmission shaft, a friction clutch for operating said tubular shaft by said engine shaft, a power takeoff shaft, gearing connecting said shiftable shaft with said power takeoff shaft, a clutch for connecting said shiftable shaft with said tubular shaft or said engine shaft, whereby said power takeoff shaft can be operated either simultaneously with said transmission gearing or independently thereof by said engine shaft, and a coupling in a non-rotative sliding engagement with one end of said transmission shaft and movable into non-rotative engagement with the adjacent end of said shiftable shaft when the latter is in engagement with said tubular shaft, whereby said transmission is driven directly from said engine shaft.

14. In a tractor, an engine shaft, a transmission shaft disposed coaxially therewith, a longitudinally shiftable shaft disposed between and coaxially with said shafts, a tubular shaft journaled concentrically with said shiftable shaft, transmission gearing connecting said tubular shaft with said transmission shaft, a friction clutch for operating said tubular shaft by said engine shaft, a power takeoff shaft, gearing connecting said shiftable shaft with said power takeoff shaft, a clutch for connecting said shiftable shaft with said tubular shaft or said engine shaft, whereby said power takeoff shaft can be operated either simultaneously with said transmission gearing or independently thereof by said engine shaft, a coupling in a non-rotative sliding engagement with one end of said transmission shaft and movable into non-rotative engagement with the adjacent end of said shiftable shaft when the latter is in engagement with said tubular shaft, whereby said transmission is driven directly from said engine shaft, and a manually controlled lever for shifting said coupling.

15. In a tractor, an engine shaft, a transmission shaft disposed coaxially therewith, a longitudinally shiftable shaft disposed between and coaxially with said shafts, a tubular shaft journaled concentrically with said shiftable shaft, transmission gearing connecting said tubular shaft with said transmission shaft, a friction clutch for operating said tubular shaft by said engine shaft, a power takeoff shaft, gearing connecting said shiftable shaft with said power takeoff shaft, a clutch for connecting said shiftable shaft with said tubular shaft or said engine shaft, whereby said power takeoff shaft can be operated either simultaneously with said transmission gearing or independently thereof by said engine shaft, a coupling in a non-rotative sliding engagement with one end of said transmission shaft and movable into non-rotative engagement with the adjacent end of said shiftable shaft when the latter is in engagement with said tubular shaft, whereby said transmission is driven directly from said engine shaft, and safety means for permitting shifting of said coupling into engagement with said shiftable shaft only when the latter is in engagement with said tubular shaft.

16. In a tractor having an engine shaft and a transmission shaft disposed coaxially with each other; a longitudinally shiftable shaft disposed between said shafts coaxially therewith, a tubular shaft concentrically mounted with said shiftable shaft, means for driving said tubular shaft from said engine shaft, a transmission counter shaft journaled to one side of the vertical plane of said coaxially aligned shafts and in driving engagement with said tubular shaft, transmission gearing operatively connecting said transmission counter shaft with said transmission shaft, a power takeoff shaft disposed below said aligned shafts, a power takeoff counter shaft in driving engagement with said shiftable shaft, and gearing connecting said last mentioned shaft with said power takeoff shaft, a friction clutch for connecting said engine shaft with said tubular shaft, and a clutch for connecting said shiftable shaft either with said engine shaft or said tubular shaft.

17. In a tractor, an engine shaft, a transmission casing, a transmission shaft journaled in said casing coaxially with said engine shaft, a longitudinally shiftable shaft journaled in said casing coaxially with and between said first mentioned shafts, a tubular shaft journaled in said casing concentrically with said shiftable shaft, a friction clutch connecting one end of said tubular shaft with said engine shaft, a transmission counter shaft journaled in said casing below and to one side of said transmission shaft, gearing connecting said counter shaft with the other end of said tubular shaft, selective transmission gearing connecting said counter shaft with said transmission shaft, a power takeoff counter shaft journaled in said casing below said transmission shaft and having one end projecting outwardly from said casing, gearing connecting the other end of said power takeoff counter shaft with said shiftable shaft, a detachable casing secured to said transmission casing and enclosing said projecting shaft end, a power takeoff shaft having one end journaled in said detachable housing and projecting rearwardly therefrom, gearing mounted in said detachable casing and establishing driving connection between the projecting end of said power takeoff counter shaft and said power takeoff shaft, and means for connecting said shiftable shaft with said tubular shaft.

18. In a tractor, an engine shaft, a transmission casing, a transmission shaft journaled in said casing coaxially with said engine shaft, a longitudinally shiftable shaft journaled in said casing coaxially with and between said first mentioned shafts, a tubular shaft journaled in said casing concentrically with said shiftable shaft, a friction clutch connecting one end of said tubular shaft with said engine shaft, a transmission counter shaft journaled in said casing below and to one side of said transmission shaft, gearing connecting said counter shaft with the other end of said tubular shaft, selective transmission gearing connecting said counter shaft with said transmission shaft, a power takeoff counter shaft journaled in said casing below said transmission shaft and having one end projecting outwardly from said casing, gearing connecting the other end of said power takeoff counter shaft with said shiftable shaft, a detachable casing secured to said transmission casing and enclosing said projecting shaft end, a power takeoff shaft having one end journaled in said detachable casing and projecting rearwardly therefrom, gearing mounted in said detachable casing and establishing driving connection between the projecting end of said power takeoff counter shaft and said power takeoff shaft, a clutch element on said tubular shaft, a clutch element on said engine shaft, and a double-faced clutch element fixed on said shiftable shaft between said other clutch elements and movable with said shiftable shaft into engagement with either one of said other clutch elements, whereby said power takeoff shaft can be operated either through said tubular shaft or directly by said engine shaft.

19. In a tractor having an engine shaft and a power delivery shaft disposed coaxially with each other; a pair of concentric shafts disposed between and coaxially with said first mentioned shafts, a fly wheel fixed to said engine shaft, a friction clutch fixed on one end of the outer one of said concentric shafts and engaging said fly wheel, a transmission counter shaft disposed below said concentric shafts, gearing for operatively connecting said outer shaft with said counter shaft, transmission gearing connecting said counter shaft with said power delivery shaft, a power takeoff shaft disposed parallel with and below said concentric shafts, and means transmitting the rotative power from the inner one of said concentric shafts to said power take-off shaft and spanning said transmission counter shaft and gearing.

20. In a tractor having an engine shaft and a power delivery shaft disposed coaxially with each other, a pair of concentric shafts disposed between and coaxially with said first mentioned shafts, a fly wheel fixed to said engine shaft, a friction clutch fixed on one end of the outer one of said concentric shafts and engaging said fly wheel, a tractor driving gear on the other end of said last-named shaft, means to rotate said inner one of said concentric shafts, a power takeoff shaft disposed parallel with said concentric shafts, power takeoff gearing transmitting the rotative power from the inner one of said concentric shafts to said power takeoff shaft, and driving means actuated by the outer one of said concentric shafts and operating said power delivery shaft, said driving means spanning said power takeoff gearing.

EMIL F. STUMPF.